United States Patent
Kovacs et al.

(10) Patent No.: US 12,113,175 B2
(45) Date of Patent: *Oct. 8, 2024

(54) ELECTROLYTE FOR SUPERCAPACITOR AND HIGH-POWER BATTERY USE

(71) Applicant: BroadBit Batteries Oy, Espoo (FI)

(72) Inventors: Andras Kovacs, Espoo (FI); Tapani Alasaarela, Espoo (FI); David Lloyd, Espoo (FI); David Brown, Helsinki (FI)

(73) Assignee: BROADBIT BATTERIES OY, Espoo (FI)

( * ) Notice: Subject to any disclaimer, the term of this patent is extended or adjusted under 35 U.S.C. 154(b) by 557 days.

This patent is subject to a terminal disclaimer.

(21) Appl. No.: 16/494,879

(22) PCT Filed: Mar. 14, 2018

(86) PCT No.: PCT/FI2018/050182
§ 371 (c)(1),
(2) Date: Sep. 17, 2019

(87) PCT Pub. No.: WO2018/167365
PCT Pub. Date: Sep. 20, 2018

(65) Prior Publication Data
US 2020/0227786 A1    Jul. 16, 2020

(30) Foreign Application Priority Data
Mar. 17, 2017    (FI) ...................................... 20175239

(51) Int. Cl.
*H01M 10/0569*    (2010.01)
*H01G 11/60*    (2013.01)
(Continued)

(52) U.S. Cl.
CPC ........ *H01M 10/0569* (2013.01); *H01G 11/60* (2013.01); *H01G 11/62* (2013.01); *H01M 10/0568* (2013.01); *H01M 2300/0028* (2013.01)

(58) Field of Classification Search
CPC ......... H01M 10/0569; H01M 10/0568; H01M 2300/0028; H01G 11/60; H01G 11/62
See application file for complete search history.

(56) References Cited

U.S. PATENT DOCUMENTS

2005/0090528 A1    4/2005    Henton et al.
2007/0129401 A1    6/2007    Henton et al.
(Continued)

FOREIGN PATENT DOCUMENTS

CN    103904356 A    7/2014
CN    104701029 A    6/2015
(Continued)

OTHER PUBLICATIONS

English machine translation of Ding et al. (CN 20140308544 A1) (Year: 2016).*
(Continued)

*Primary Examiner* — Victoria H Lynch
(74) *Attorney, Agent, or Firm* — Ware, Fressola, Maguire & Barber LLP

(57) ABSTRACT

The present application relates to an electrochemical cell comprising
a nitrile-based solvent based electrolyte, wherein
the electrochemical cell includes an electrolyte salt that comprises $NaClO_4$, and
the electrolyte salt has a maximum electrolyte conductivity at a discharge state Molar concentration greater than 1.

11 Claims, 1 Drawing Sheet

(51) Int. Cl.
  *H01G 11/62* (2013.01)
  *H01M 10/0568* (2010.01)

(56) References Cited

U.S. PATENT DOCUMENTS

| | | | |
|---|---|---|---|
| 2012/0081837 | A1 | 4/2012 | Gadkaree et al. |
| 2014/0065465 | A1 | 3/2014 | Johnson et al. |
| 2014/0295238 | A1 | 10/2014 | Chae et al. |
| 2014/0308544 | A1 * | 10/2014 | Wessells ............... H01M 4/485 429/188 |
| 2015/0064574 | A1 | 3/2015 | He et al. |
| 2016/0071658 | A1 | 3/2016 | Azais et al. |
| 2016/0118687 | A1 | 4/2016 | Nakanishi |
| 2016/0118688 | A1 | 4/2016 | Nakanishi |
| 2016/0240840 | A1 | 8/2016 | He et al. |
| 2016/0260551 | A1 | 9/2016 | Nanda et al. |
| 2017/0077546 | A1 | 3/2017 | Zhamu et al. |
| 2018/0183052 | A1 * | 6/2018 | Zhamu ................. H01M 50/46 |
| 2018/0330893 | A1 | 11/2018 | Zhamu et al. |
| 2018/0331387 | A1 * | 11/2018 | Kovacs ................. H01M 10/44 |
| 2020/0058958 | A1 * | 2/2020 | Kovacs ................. H01M 4/485 |

FOREIGN PATENT DOCUMENTS

| | | | |
|---|---|---|---|
| CN | 105355973 A * | 2/2016 | |
| CN | 104008889 B | 3/2017 | |
| EP | 0 208 254 A2 | 1/1987 | |
| EP | 2881366 A1 | 6/2015 | |
| EP | 2989648 A1 | 3/2016 | |
| FI | 126390 B | 11/2016 | |
| JP | 2005116629 A | 4/2005 | |
| JP | 2010165674 A | 7/2010 | |
| JP | 2013539245 A | 10/2013 | |
| JP | 2014116586 A | 6/2014 | |
| JP | 2016519842 A | 10/2014 | |
| JP | 2020520100 A | 7/2020 | |
| RU | 2612192 C1 | 3/2017 | |
| TW | 201708206 A | 3/2017 | |
| WO | 2014/173891 A1 | 10/2014 | |
| WO | WO-2014200012 A1 * | 12/2014 | .......... H01M 10/052 |
| WO | 2015072577 A1 | 5/2015 | |
| WO | 2017055678 A1 | 4/2017 | |

OTHER PUBLICATIONS

English machine translation of Furukawa et al. (WO 20142000012 A1) (Year: 2014).*
English language Abstract of CN103904356A.
English language Abstract of TW201708206A.
English language translation of application, including Abstract of CN104008889B.
English language Abstract of RU2612192C1.
English language Abstract of CN104701029A.
English language Abstract of JP2005116629A.
English language Abstract of JP2020520100A.
English language Abstract of EP2989648A1.
English language translation of application, including Abstract of JP2014116586A.
English language Machine Translation of JP2016519842A.
Herlem, G., et al.,A New Relation Between the Maxima Conductivities of Nonaqueous Concentrated Electrolytes and Chemical Hardness of Solvents and Salts,Journal of Solution Chemistry, Mar. 1999, pp. 223-235, vol. 28, No. 3, Picnum Publishing Corp.
Tao, Y., et al., Towards ultrahigh volumetric capacitance: graphene derived highly dense but porous carbons for supercapacitors, Scientific Reports 3, 2975; DOI:10.1038/srep02975, Oct. 17, 2013, pp. 1-8.

* cited by examiner

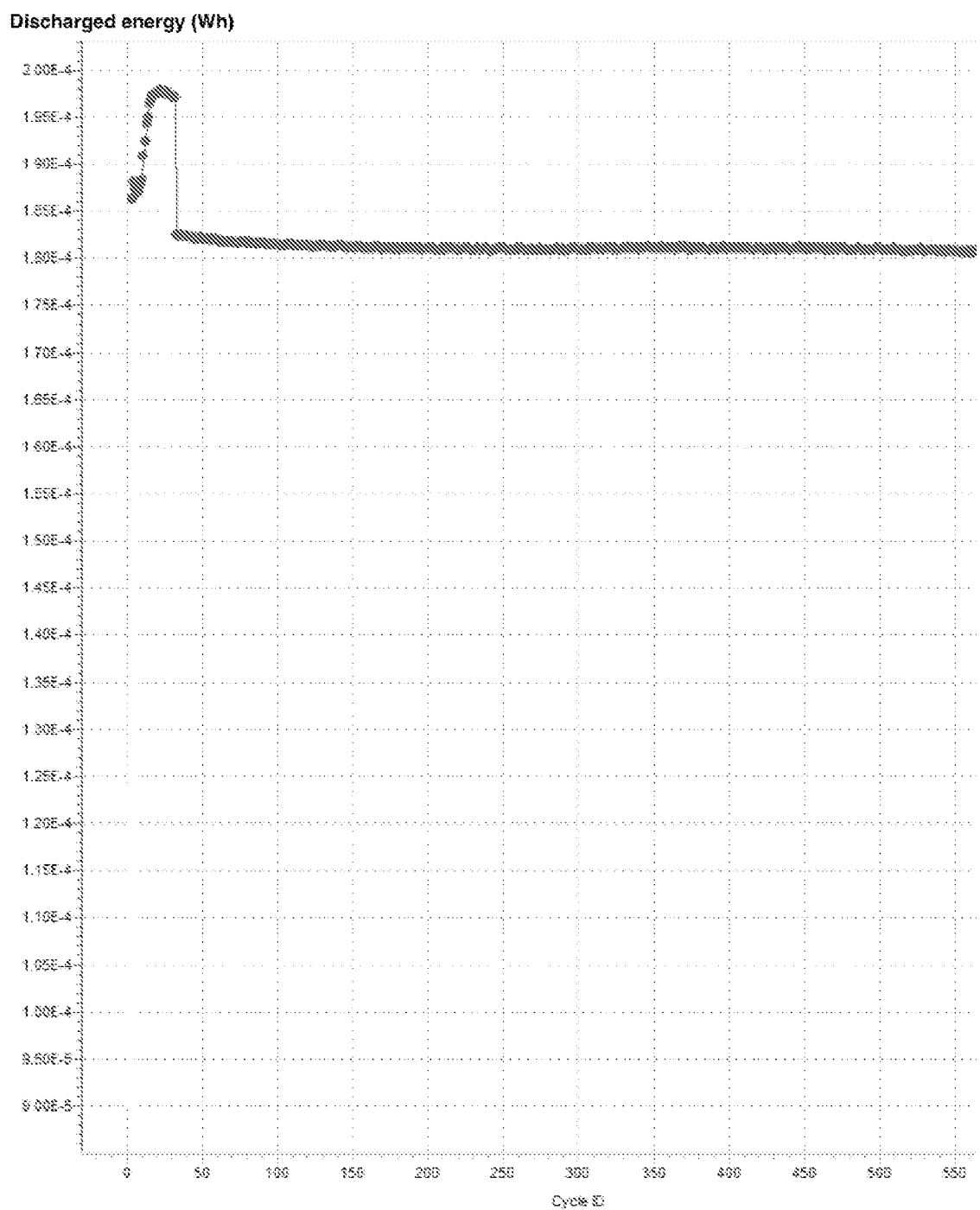

ELECTROLYTE FOR SUPERCAPACITOR AND HIGH-POWER BATTERY USE

FIELD OF THE INVENTION

The invention relates to rechargeable electrochemical cells such as batteries, for instance high-power batteries or fast-charging and supercapacitors. In particular, the present invention concerns the improvement of electrolytes for these electrochemical cells.

BACKGROUND OF THE INVENTION

High performance and low cost supercapacitors and fast batteries are advantageous for many applications in e.g., starter batteries or fast charging electric vehicles.

Electrolyte salts employed for supercapacitors or high-power or fast-charging batteries are generally in the 1 to 1.5 Molar concentration range, which corresponds to the ionic conductivity maxima of currently used salts. The use of $NaClO_4$ as a possible electrolyte salt with acetonitrile solvent has been previously known in the art. However, all related publications describe electrolyte formulations employing $NaClO_4$ salt concentration of 1 Molar or less in the acetonitrile solvent.

As the technology advances for making electric double-layer supercapacitor electrodes with ever higher volumetric capacitance, the use of highly concentrated supercapacitor electrolytes becomes essential. For instance, publication [2] describes porous carbon based supercapacitor electrodes achieving 170 $F/cm^3$ volumetric capacitance with acetonitrile solvent based electrolytes. These electrodes have 70% space filling, i.e. is only 30% of the electrode volume is empty space for the electrolyte. Based on the data of publication [2], charging up such symmetric supercapacitor to 2.7 V voltage would require 4 Molar initial salt concentration, if all the electrolyte would be within the symmetric electrode volume. Under existing electrolyte formulations, significant excess electrolyte is required to use this capacity. Novel electrolyte formulations allowing increased volumetric capacity by minimizing the need of such excess electrolyte are a benefit to industry and commerce.

SUMMARY OF THE INVENTION

In the current invention, highly concentrated salts which have high ionic conductivity, are cost effective and support a wide voltage window are disclosed. Previously known highly concentrated electrolytes were poorly conductive and expensive.

Acetonitrile is frequently employed as an electrolyte solvent in supercapacitors. It can be also used as electrolyte solvent in certain high-power and/or fast-charging batteries, where the electrode cycling voltages are compatible with its voltage window. This invention discloses significant improvements in the acetonitrile solvent based electrolytes' conductivity, cost-efficiency, and compatibility with advanced electrode structures. These improvements are realized through the use of highly concentrated $NaClO_4$ containing electrolyte salt—either as a sole electrolyte salt or in combination with other salts (co-salts) in combination with nitrile-based solvents. The current invention advances the state-of-the art in supercapacitors and high-power batteries for these and other applications. The improvements are realized in terms of the electrolyte's conductivity, cost-efficiency, and compatibility with advanced electrode structures. The described invention is, thus, beneficial to industry and commerce.

BRIEF DESCRIPTION OF THE DRAWINGS

FIG. 1 shows the capacity evolution of a symmetric supercapacitor employing 3 Molar $NaClO_4$ salt concentration in acetonitrile solvent. Both electrodes are made from porous carbon on aluminum substrate. The supercapacitor has been charged up to 2.7 V during the cycling. The initial 30 cycles were performed at 0.5 $mA/cm^2$ current rate, and subsequent cycles were performed at 2 $mA/cm^2$ current rate.

DETAILED DESCRIPTION OF THE EMBODIMENTS

Detailed embodiments of the present invention are disclosed herein with the reference to accompanying drawings.

An electrochemical cell may comprises, at least, an anode, a cathode and an electrolyte at least partially between the anode and cathode. An electrochemical cell may further comprise a separator between the anode and cathode. An electrochemical cell may further comprise one or more charge carriers. An electrochemical cell may further comprise a housing. The electrolyte of an electrochemical cell may comprise a sodium-based salt. The electrolyte of an electrochemical cell may comprise a nitrile-based solvent. The sodium-based salt of the electrolyte may be $NaClO_4$. The electrochemical cell may be symmetric in which case both the anode and cathode materials are essentially the same. The electrochemical cell may be asymmetric in which case the anode and cathode materials are essentially not the same. The electrochemical cell may be a supercapacitor or a battery. The battery may be a primary (single-use) or secondary (rechargable) battery.

The ionic conductivity maximum of $NaClO_4$ electrolyte salt with acetonitrile solvent has been previously stated to occur at 0.55 Molar concentration [1], however, we have surprisingly discovered that, contrary to other commonly used electrolyte salts, the ionic conductivity of the electrolyte comprising $NaClO_4$ salt in acetonitrile solvent increases with high molar concentration. After some point, the conductivity was found to decrease as the $NaClO_4$ concentration became over concentrated. Specifically, it was found that the ionic conductivity of the electrolyte increases with increasing $NaClO_4$ concentration, and reaches a conductivity maximum at approximately 3 Molar concentration.

At electrolyte salt Molar concentration above 1, the electrolyte salt may be considered to be highly concentrated. At Molar concentration at or above 1.25, the electrolyte salt may be considered to be highly concentrated. At Molar concentration above 1.5, the electrolyte salt may be considered to be highly concentrated. At Molar concentration at or above 1.75, the electrolyte salt may be considered to be highly concentrated. At Molar concentration at or above 2, the electrolyte salt may be considered to be highly concentrated. At Molar concentration at or above 2.25, the electrolyte salt may be considered to be highly concentrated. At Molar concentration at or above 2.5, the electrolyte salt may be considered to be highly concentrated. At Molar concentration at or above 2.75, the electrolyte salt may be considered to be highly concentrated. At Molar concentration of at or above approximately 3, the electrolyte salt may be considered to be highly concentrated.

At electrolyte salt Molar concentration at or below 1, the electrolyte salt may be considered to be low concentration.

At Molar concentration below 0.95, the electrolyte salt may be considered to be low concentration. At Molar concentration below 0.7, the electrolyte salt may be considered to be low concentration. At Molar concentration below 0.5, the electrolyte salt may be considered to be low concentration. At Molar concentration below 0.35, the electrolyte salt may be considered to be low concentration. At Molar concentration below 0.25, the electrolyte salt may be considered to be low concentration. At Molar concentration below 0.2, the electrolyte salt may be considered to be low concentration. At Molar concentration below 0.15, the electrolyte salt may be considered to be low concentration.

The lower bound of the electrolyte salt concentration between charge and discharge state of the electrochemical cell may be its highly concentrated value. The upper bound of the electrolyte molar concentration may be at or near its solubility limit in the electrolyte solvent. The Molar concentration of the electrolyte salt may be between any combination of lower (high concentration) and upper (solubility limit in the electrolyte solvent) bounds. Said solubility limit varies according to the solvents and salts present. Near, in terms of solubility limit, here may mean an electrolyte Molar concentration above 70% of its solubility limit in the electrolyte solvent. Near, in terms of solubility limit, here may mean an electrolyte Molar concentration above 85% of its solubility limit in the electrolyte solvent. Near, in terms of solubility limit, here may mean an electrolyte Molar concentration above 90% of its solubility limit in the electrolyte solvent. Near, in terms of solubility limit, here may mean an electrolyte Molar concentration above 95% of its solubility limit in the electrolyte solvent. Near, in terms of solubility limit, here may mean an electrolyte Molar concentration above 98% of its solubility limit in the electrolyte solvent. Near, in terms of solubility limit, here may mean an electrolyte Molar concentration above 99% of its solubility limit in the electrolyte solvent. In the case when the electrochemical cell is a supercapacitor, the Molar concentration refers to the concentration in the fully discharged state or the assembled state and corresponds to the highest Molar concentration in the charge/discharge cycle. In the case of a supercapacitor, the Molar concentration may decrease during charging and may even drop to approximately zero in the fully charged state (the Molar concentration cannot drop to exactly zero or the electrolyte would no longer conduct ions). In the case when the electrolytic cell is a battery, the Molar concentration does not essentially change between charge and discharge states and the Molar concentration refers to the essentially constant Molar concentration.

Any combination of the described high concentration bound, solubility limit bound and/or ranges are possible. For the avoidance of doubt, when a co-salt is present in an electrolyte, as described below, the electrolyte salt concentration (or salt concentration) refers to the combined $NaClO_4$:co-salt concentration.

Table 1 shows the dependence of the electrolyte conductivity on the $NaClO_4$ concentration in a system without co-salt. Other solvents are possible, most preferably nitrile-based solvents are possible.

TABLE 1

Ionic conductivity of the $NaClO_4$ salt in acetonitrile solvent, as a function of salt concentration

| | $NaClO_4$ Concentration | | | | |
|---|---|---|---|---|---|
| | 0.5M | 2M | 2.5M | 3M | 3.5M |
| Electrolyte conductivity | 31 mS/cm | 35 mS/cm | 36.5 mS/cm | 38.5 mS/cm | 35.5 mS/cm |

It has been furthermore discovered, that it is feasible to maintain the same 38.5 mS/cm conductivity maximum at an even higher electrolyte salt concentration by employing a mixture of electrolyte salts in the acetonitrile solvent, where $NaClO_4$ a salt component. As an example, Table 2 shows the electrolyte conductivity development obtained with a 4:1 ratio mixture of $NaClO_4$:$NaPF_6$ salts in acetonitrile solvent. The 38.5 mS/cm ionic conductivity maximum is reached at 3.5 Molar total electrolyte salt concentration. Other sodium containing co-salts besides $NaPF_6$ are possible; examples of suitable co-salts include but are not limited to Sodium-triflate ($CF_3SO_3Na$, denoted as NaTriflate) or Sodium-difluoro(oxalato)borate ($C_2O_4BF_2Na$, denoted as NaDFOB). Other ratios of $NaClO_4$:sodium containing co-salts are possible. The $NaClO_4$:sodium containing co-salt ratio may be between 0.5:1 and 32:1. The $NaClO_4$:sodium containing co-salt ratio may be between 1:1 and 16:1. The $NaClO_4$:sodium containing co-salt ratio may be between 2:1 and 8:1, and more preferably between 3:1 and 6:1 and most preferably approximately 4:1. Any combination of the described upper and lower limits of the listed $NaClO_4$:sodium containing co-salt ratios are possible.

TABLE 2

Ionic conductivity of the 4:1 ratio of $NaClO_4$:$NaPF_6$ salt mixture in acetonitrile solvent, as a function of total salt concentration

| | Total salt concentration | | | | |
|---|---|---|---|---|---|
| | 1M | 1.5M | 2M | 3M | 3.5M |
| Electrolyte conductivity | 31 mS/cm | 34 mS/cm | 34.5 mS/cm | 37 mS/cm | 38.5 mS/cm |

The abovesaid electrolyte formulations enable the cost-effective production of highly conductive supercapacitor and/or battery electrolytes, which are compatible with the full voltage window of the acetonitrile solvent. These electrolyte formulations are furthermore compatible with aluminum current collector substrates, as evidenced by the stable cycling capacity shown in FIG. 1.

During cycling of an electric double-layer supercapacitor with a high volumetric capacitance, the ideal electrolyte salt concentration strongly can vary between high concentration (e.g. 3-3.5 Molar in the discharged state) and low concentration (e.g. 0.2-0.5 Molar in the charged state). The use of the highly concentrated electrolyte salt described here, therefore, becomes an important consideration for high volumetric capacity supercapacitors in order to minimize the needed excess electrolyte, and thus maximize the device-level energy density. The use of the herein disclosed electrolyte formulations is therefore particularly advantageous, as such electrolytes are able to deliver >30 mS/cm ionic conductivity over a wide range of Molar salt concentrations as may exist between charge and discharge state (e.g. from below 0.5 Molar concentration to above 3.5 Molar concentration).

In one embodiment is provided an electrochemical cell comprising a nitrile-based solvent based electrolyte wherein, the electrolyte salt comprises $NaClO_4$ and, at any stage of charge of the electrochemical cell, the electrolyte salt has a high Molar concentration in the discharged state.

In one embodiment is provided an electrochemical cell comprising a nitrile-based solvent based electrolyte wherein, the electrolyte salt comprises $NaClO_4$ and the electrolyte salt has Molar concentration in the discharged state greater than 1.

In one embodiment, the nitrile-based solvent is acetonitrile.

In one embodiment, the electrolyte salt further comprises a sodium containing co-salt.

In one embodiment, the co-salt is $NaPF_6$, NaTriflate, NaDFOB, or any combination thereof.

In one embodiment, at any stage of charge of the electrochemical cell, the electrolyte salt is at or near its solubility limit in the electrolyte solvent.

The electrochemical cells of the present invention may be used in a device. One or more electrochemical cells of the present invention may be used in a battery pack. The battery pack may contain a plurality of individual cells in series, in parallel or in any combination thereof. The cell and/or the battery pack may be used in combination with an battery management system. The electrochemical cell and/or battery pack of the present invention may be used in, for instance, an electric vehicle, such as a car, truck, bike, motorcycle, scooter, drone, manned or unmanned aircraft, an uninterrupted power supply, a backup power supply, a personal, local, regional or grid storage or grid stabilization unit or an engine starter battery. The electrochemical cell and/or battery pack of the present invention may be used in other devices.

REFERENCES

[1] G. Herlem et al, Journal of Solution Chemistry, Vol. 28 (1999), No. 3, Pp. 223-235.

[2] Y. Tao at el, DOI: 10.1038/srep02975

The invention claimed is:

1. An electrochemical cell comprising:
a nitrile-based solvent based electrolyte, wherein
the electrochemical cell includes an electrolyte salt that comprises $NaClO_4$, the electrolyte salt concentration in a discharge state is greater than 1.5,
the electrolyte salt has a maximum electrolyte conductivity at a discharge state Molar concentration greater than 1; wherein
i) the electrolyte salt further comprises a sodium containing co-salt having a co-salt ratio between 0.5:1 and 32:1; and/or
ii) the electrolyte salt concentration in the discharge state is less than 3.5.

2. The electrochemical cell according to claim 1, wherein the nitrile-based solvent based electrolyte is acetonitrile.

3. The electrochemical cell according to claim 2, wherein the co-salt is $NaPF_6$, NaTriflate, NaDFOB, or any combination thereof.

4. A device comprising the electrochemical cell according to claim 2.

5. The electrochemical cell according to claim 1, wherein the co-salt is $NaPF_6$, NaTriflate, NaDFOB, or any combination thereof.

6. A device comprising the electrochemical cell according to claim 5.

7. A device comprising the electrochemical cell according to claim 1.

8. The device according to claim 7, wherein the device is a battery pack.

9. The device according to claim 8, wherein the device is an electric vehicle, an uninterrupted power supply, a backup power supply, a personal, local, regional or grid storage or grid stabilization unit or an engine starter battery.

10. The device according to claim 7, wherein the device is an electric vehicle, an uninterrupted power supply, a backup power supply, a personal, local, regional or grid storage or grid stabilization unit or an engine starter battery.

11. The electrochemical cell according to claim 1, wherein the nitrile-based solvent based electrolyte is a liquid electrolyte.

* * * * *